UNITED STATES PATENT OFFICE.

CHARLES H. MacDOWELL, OF CHICAGO, ILLINOIS, ASSIGNOR TO THE MINERAL PRODUCTS COMPANY, OF NEW YORK, N. Y., A CORPORATION OF WEST VIRGINIA.

TREATMENT OF ALUNITE AND THE LIKE.

1,136,549.      Specification of Letters Patent.      Patented Apr. 20, 1915.

No Drawing.      Application filed July 31, 1914. Serial No. 854,278.

*To all whom it may concern:*

Be it known that I, CHARLES H. MAC-DOWELL, a citizen of the United States, residing at Chicago, county of Cook, State of Illinois, have invented certain new and useful Improvements in the Treatment of Alunite and the like; and I do hereby declare the following to be a full, clear, and exact description of the invention, such as will enable others skilled in the art to which it appertains to make and use the same.

The present invention relates to the treatment of alunite, alum rock, alum stone and the like, for the recovery of the alkaline salts (principally potassium salts) contained therein.

As a typical example of the material suitable for the practice of the invention, it may be assumed, for instance, that the alunite employed may have a general formula say substantially as follows, to wit: $Al_2O_3$, 37.18; $Fe_2O_3$, trace; $SO_3$, 38.34; $P_2O_5$, .58; $K_2O$, 10.46; $Na_2O$, .33; $H_2O+$, 12.90; $H_2O-$, .09; $SiO_2$, .22. It will, of course, be understood, that this analysis is merely typical of other and like analyses of alunite, and that it is given for the purpose of indicating generally the character of the raw material which has been found particularly serviceable in practice.

In carrying out the invention, the procedure is as follows: The alunite or like material referred to is calcined under the conditions, specified, for instance, in U. S. patent issued to Howard F. Chappell, No. 1,070,324 under date of August 12, 1913, and at a temperature sufficient to drive off the sulfur combined with the alumina in the form of sulfurous anhydrid and sulfuric anhydrid. The product of this calcining operation consists of alumina insoluble in alkali, and of potash (potassium sulfate) soluble in water, together with a minor portion of water-soluble sodium sulfate. The temperatures required for the driving off of the sulfurous anhydrid and sulfuric anhydrid, in the calcining operation referred to, leaves the potassium and sodium salts, as indicated, as constituents of the calcined product. Instead of leaching out the water-soluble potash and sodium salts thus remaining in the calcined material, the present invention involves raising the temperature of the calcined material to such a degree that they will be driven off from the calcined alunite by volatilization. In practice, it is found that a temperature ranging from say 1100° C. to 1600° C. is sufficient to volatilize and drive off practically all of the potassium salts, and with them such small quantity of sodium salts as may be present,—the operation when conducted at as high a temperature as 1600° C. leaving traces only (say not more than about .5% of $K_2O$ and $Na_2O$) in the calcined alunite treated. It is also found that the volatilized potassium and sodium salts may be recovered as such in solid form by conveying them into a cooling flue or receptacle wherein, as the temperature drops below the temperature of volatilization, they will be deposited, and from which they may be collected in condition suitable for utilization, storage, or shipment, as dry products. This capacity of the process, *i. e.*, to yield, as a direct product of the operation, the volatilized and subsequently deposited salts in dry form, avoids the expense and inconvenience attendant upon their recovery by leaching, and is of further industrial importance in those localities where sufficient quantities of water are either unavailable or are difficult of procuring. So also, the volatilization of the salts, according to the present invention, may immediately succeed the preliminary calcining operation, so that, in such instance, it will merely be necessary to add the requisite additional units of heat to effect the desired result; thereby substituting a furnace operation for the combined furnace operation and leaching operation of the former practice. Where water is freely available, or where it is desired, for any special reason, to recover the volatilized salts in the form of a solution, they may be brought into contact with water, as, for instance, by spraying them with water in the collecting flue or chamber, or otherwise. In general, however, it will be preferable to recover them in the dry state, as hereinbefore indicated. The calcined alunite to be treated for the volatilization of its potassium and sodium salts may be heated, to the desired temperature, in any suitable manner, (as, for instance, either by external or internal heating, electrical, or otherwise), and either in a neutral atmosphere, a reducing atmosphere, or an oxidizing atmosphere. My invention involves the further discovery that if the calcined alunite, in a finely divided condition, is admixed with from 20% to 50% of carbon (preferably in the form of powdered coal, powdered coke, lamp black, or the like), the temperature at which the volatilization of the salts takes place can be very considerably lowered,—in some cases, the volatilization beginning at as low a temperature as 800° C. The intermingling of the carbon with the charge has not only the favorable effect of lowering the temperature at which the salts will volatilize, but the carbon serves mechanically to assist in the disengagement of the volatilized salts. In order to make available to the best degree the useful functions due to the presence of carbon in the charge, a sufficient surplus of carbon should be provided if air or any other carbon-consuming agent is introduced into the rotary kiln or other furnace in which the charge is being treated, so as to practically maintain the percentage of carbon in the charge at from 20% to 50% over the amount consumed by the introduced carbon-consuming agent. It will be found convenient, in some instances, to start with the introduction of the carbon into the raw alunite charged into the calcining kiln, so that the carbon may be present and in a highly heated condition in the charge when, upon raising the temperature, the volatilization of the salts begins. This introduction of carbon into the initial charge of raw alunite has the further advantage of avoiding the additional expense and inconvenience of separately admixing the carbon with the charge after calcination of the raw alunite. The passage of a current of nitrogen, a current of air, a current of products of combustion, or the like, through the charge has the further useful effect of assisting in carrying off the volatilized salts.

While the practice of the invention is not restricted to the use of any particular apparatus, it will be found convenient to employ the usual inclined rotary kiln.

In so far as I am aware, the discovery that, by the application of heat to calcined alunite, the potash and sodium salts contained therein, can be volatilized and driven off as such is broadly new and fundamental, and could not have been predicted by those skilled in the art. On the contrary, in view of the fact that sodium aluminate is manufactured by heating bauxite, or some other form of alumina, with carbon and sodium sulfate, the logical inference would have been that a mixture of carbon with calcined alunite containing potassium sulfate, would, on heating, be converted into potassium aluminate, which, as hereinbefore indicated, is not the fact.

What I claim is:

1. The method of treating alunite and the like, which comprises first calcining the alunite for the purpose of driving off sulfurous anhydrid and sulfuric anhydrid, and then heating it to a higher temperature to volatilize and drive off potash.

2. The method of treating alunite and the like, which comprises first calcining the alunite for the purpose of driving off sulfurous anhydrid and sulfuric anhydrid, and then heating it to a higher temperature, in the presence of carbon, to volatilize and drive off potash.

3. The method of treating alunite and the like, which comprises first calcining the alunite for the purpose of driving off sulfurous anhydrid and sulfuric anhydrid, then heating it to a higher temperature sufficient to volatilize and drive off potash, and depositing the volatilized potash as a solid.

4. The method of treating alunite and the like, which comprises calcining the alunite for the purpose of driving off sulfurous anhydrid and sulfuric anhydrid, then heating it to a temperature sufficient to volatilize and drive off potash, and expediting the exit of the volatilized potash from the charge by carrying it off in a gaseous current.

In testimony whereof I affix my signature, in presence of two witnesses.

CHARLES H. MacDOWELL.

Witnesses:
C. F. HAGEDORE,
F. S. LODGE.